May 3, 1932. J. JONAS 1,856,916

GROUND DETECTING MEANS FOR ELECTRIC CIRCUITS

Filed Jan. 8, 1926  2 Sheets-Sheet 1

Inventor:
Julius Jonas
By Alfred H. Dyson
Attorney.

May 3, 1932. J. JONAS 1,856,916
GROUND DETECTING MEANS FOR ELECTRIC CIRCUITS
Filed Jan. 8, 1926  2 Sheets-Sheet 2
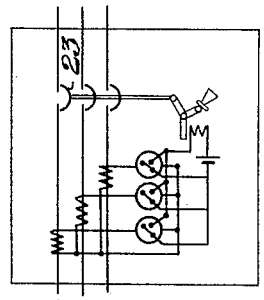
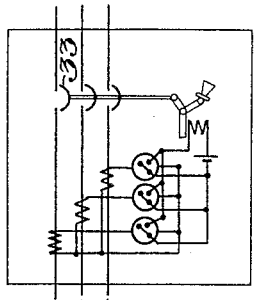
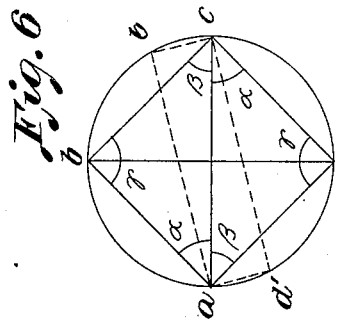
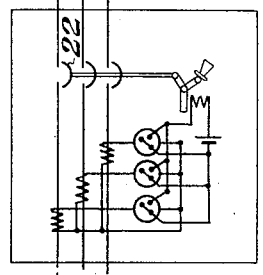
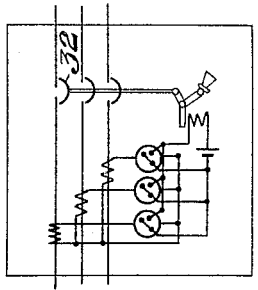
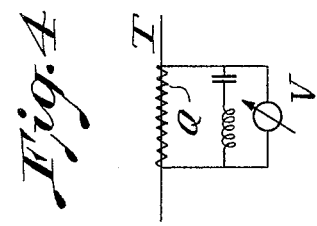
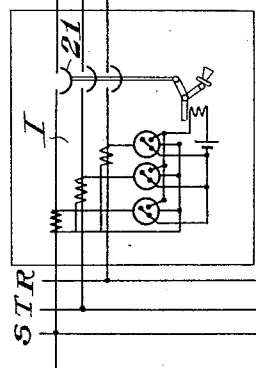
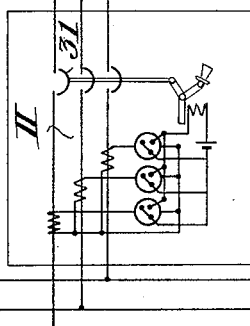
Fig. 6
Fig. 4
Fig. 5
Inventor:
Julius Jonas
By Alfred N. Dyson
Attorney.

Patented May 3, 1932

1,856,916

UNITED STATES PATENT OFFICE

JULIUS JONAS, OF BADEN, SWITZERLAND, ASSIGNOR TO AKTIENGESELLSCHAFT BROWN, BOVERI & CIE., OF BADEN, SWITZERLAND

GROUND DETECTING MEANS FOR ELECTRIC CIRCUITS

Application filed January 8, 1926, Serial No. 80,082, and in Switzerland June 13, 1925.

When a ground occurs in a feeder of a high tension network, which is protected by blow-out choke coils, it is not possible to detect, simply from the difference of potential with respect to earth, in which feeder the fault lies, as the distributing mains of all the feeders at once assume the potential of the distributing mains belonging to the feeder affected by the earth leakage. For this reason it has been proposed to use the watt component of the ground current remaining at the fault, in spite of the compensation of the blow-out choke coil, for the selective detection of the feeder in which the ground has occurred. For this purpose, in the distributing mains of the feeders, in the vicinity of their point of connection to the bus bars, watt meters are provided, the current coils of which are fed by the fault current of the distributing mains and the voltage coils of which are fed by the voltage at the blow-out choke coil. In a symmetrical network without a fault this voltage is relatively low and there is no current due to a fault and the deflection of the watt meter is zero; when a ground occurs, however, a fault current will flow and the voltage at the blow-out choke coil will rise till it reaches the full voltage of the particular phase of the network. This causes a considerabe deflection in the watt meter which is connected up in the distributing main, in which the fault has occurred, while the watt meters in the distributing mains of the same phase of the other feeders show a considerably smaller deflection. Such arrangements, however, have serious drawbacks. The fact alone that watt meters are used entails the connection of many voltage conductors to the separate instruments and, as the high tension of the blow-out choke coil cannot be used directly, it is necessary to provide one or more voltage transformers. But there is no certainty in the difference of deflection in the watt meters between a sound and a faulty network, if the blow-out choke coil shows a considerable voltage with a sound network which may, for instance, be the case as a consequence of a lack of symmetry in the network. In the case of great lack of symmetry as regards capacity and small leakage losses, even in normal operation, the voltage at the coil may be equal to or even greater than the phase voltage of the network when there may be a current due to a fault, and therefore it is possible that, even in normal conditions of the network, considerable deflections will be shown on the watt meters, which renders the selective detection of a faulty feeder very difficult, if not impossible. In the method under discussion, as already stated, the watt component of the residual earth current still persisting at the faulty place, which flows through a portion of the faulty part of the network, was used for the selective detection of the faulty feeder. According to the invention another possibility is provided by the use, for said purpose, of the higher harmonic component of the ground current also remaining in the residual ground current. In this case no indicating device connected up in the manner of a watt meter is used, but arrangements which respond to the higher harmonic frequency are used (for instance frequency meters) and the drawbacks referred to are thus avoided.

Thus the object of the present invention is to provide an indicating arrangement for selectively detecting a grounded feeder of a high tension network protected by blow-out choke coils, by connecting, in the feeders, devices which respond to higher harmonics and indicate harmonics contained in the ground current. For this purpose frequency meters having vibrating tongues may, for instance, be used, which meters indicate the simultaneous presence of several waves of different frequency. As however, the point of importance is only the detection of the higher harmonic, it is preferable to feed the frequency meters not directly with the conductor current, but through current transformers, the secondary winding of which is loosely coupled with the primary winding. By this means the sensitiveness of the tongues which respond to the higher harmonics is reduced with respect to the fundamental frequency.

A still more effective way of suppressing the fundamental in the frequency meter circuit will be given below.

The occurrence of higher harmonics is highly desirable for the purpose of selective detection and may even be assisted by such construction of the blow-out choke devices that the iron is saturated. If the choke coil, in the case of a grounded circuit, is connected with the voltage of the grounded phase, and the voltage curve is sinusoidal, the field curve of the coil will also be sinusoidal in form. However, if the coil is highly saturated at the higher ordinate values of the field curve, the curve of the magnetization current will not be sine-shaped, but its ordinate values will be greater at the higher ordinates of the field curve than for a sinusoidal curve. The current curve will, therefore, show a strong imposed third harmonic due to the fact that the grounded phase voltage is at the partial capacity of the circuit to ground. With capacitive loading, the current of each wave is $J = E\omega C$ in which, at the given voltage E, the current J is greater, the greater frequency $\omega$. The blow-out choke devices may be zero-point choke coils, pole grounding coils, extinguishing transformers, in short any transformers and choke coils used for inductive grounding. The devices for creating an artificial zero point for the connection of a choke coil, with saturated iron parts, will also assist in reinforcing more especially the third upper harmonic in the ground current. When required the indicating device may be made to act as a protective relay, for instance by being so arranged as to operate switches directly or indirectly (over other relays) in the case of occurrence of a ground which switches cut out the faulty feeder or operate signalling devices at remote points.

In Figs. 1 to 3 of the accompanying drawings various examples of the new arrangement are shown;

Fig. 4 shows one embodiment of an indicating device;

Fig. 5 is a schematic showing of a power line with a feeder line to be protected leading therefrom and provided with indicating devices connected into the several phases thereof, and Fig. 6 is a vector diagram of the relays obtaining in the circuit.

Figure 1:
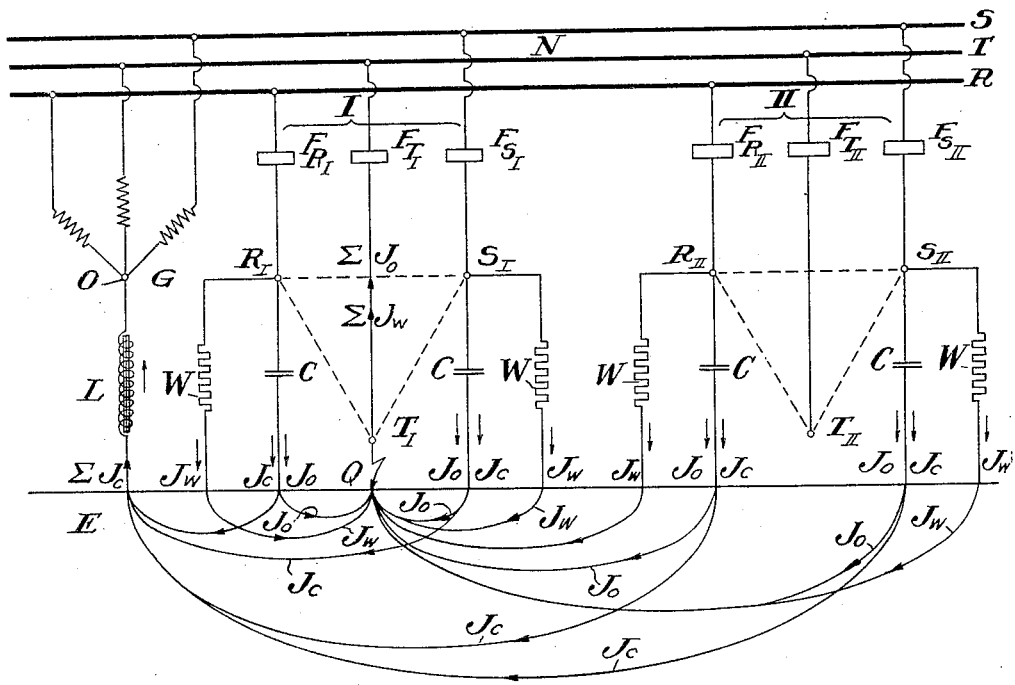

In Fig. 1, G is a three-phase generator which feeds the bus bars N, the zero-point O of which is grounded through the blow-out choke coil L. I and II are feeders, the phases being indicated by R, S and T. In the feeders leading from the bus bars N, frequency meters $F_{R_I}$, $F_{S_I}$, $F_{T_I}$, $F_{R_{II}}$, $F_{S_{II}}$, $F_{T_{II}}$, are connected, which meters indicate the occurrence of higher harmonics. This system of connections is supplemented by the condensers C corresponding to the partial capacities to ground and by the resistances W corresponding to the leakage resistances (or total loss resistances). It is assumed that the phase T of the feeder I is grounded, which ground is indicated by a zigzag arrow. Thus there is a conducting connection at the point Q between the conductor $T_I$ and the earth E and it is desired to ascertain the kind of remaining current flowing through the feeder $T_I$. Assuming that the blow-out choke coil L is approximately tuned to resonance with the partial capacities of the network (with respect to the fundamental), three kinds of currents flow to ground from each of the sound distributing mains, viz.

A loss current $J_W$

An upper harmonic current $J_o$ and

A capacity current $J_c$ of the fundamental frequency. The sum of all capacity currents $(\Sigma J_c)$ does not flow through the fault, but enters the coil L. The sum of all loss and upper harmonic currents, on the other hand, $\Sigma J_W$ and $\Sigma J_o$ enter the conductor $T_I$ and flow thorugh it to the bus-bar and the generator. Thus, while the conductor $T_I$ carries currents of higher harmonic frequency, this is not the case in the distributing main $T_{II}$ of the same phase in the feeder II. While the frequency meter $F_{T_I}$ indicates the presence of this current harmonic no deflection will be observed on the frequency meter $F_{T_{II}}$.

Figure 2:
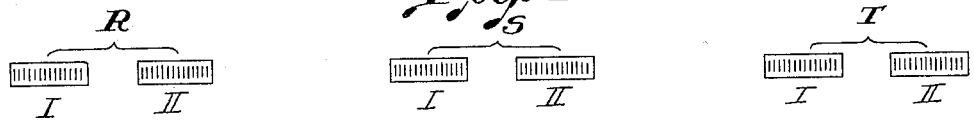

If the frequency meters of the same phase be connected up in groups, as shown in Fig. 2, the following will take place when there is a leakage to ground: Of the frequency meters of the grounded phase T, the instrument lying in the faulty conductor I gives a strong deflection, while the instrument lying in the feeder II shows no deflection. The frequency meters of the other groups show only small and approximately equal deflections. Thus it may be seen clearly and with certainty, from the behaviour of the frequency meters, which phase and which feeder is earthed.

Figure 3:
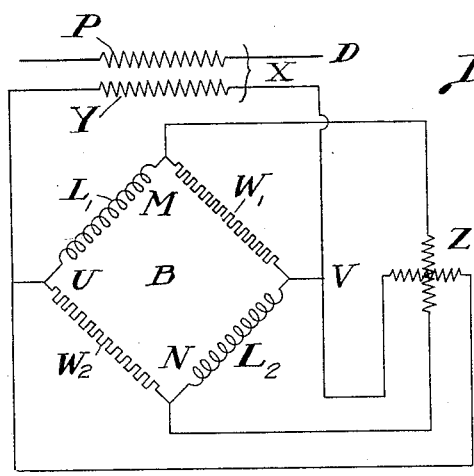

The diagram of connections in Fig. 3 shows how the indicating instrument is connected up, by which the effect of the fundamental on the instrument can be eliminated. In this figure X represents a current transformer connected in series with the conductor D and having a primary winding P and a secondary winding Y. The secondary current flows through a bridge B formed by the four arms $L_1$, $W_1$, $L_2$, $W_2$. The self inductances $L_1$ and $L_2$ and the resistances $W_1$ and $W_2$ are equal to one another and are so chosen that, on current flowing through the bridge, for the voltage of the fundamental, the diagonal M N is perpendicular as regards phase on the diagonal U V. On one coil of an indicating two coil instrument Z being connected to the points U V and the other coil to the points M N of the bridge, the instrument will show no deflection, when currents of the fundamental frequency flow through the bridge. For every higher harmonic, however, the diagonal M N in the voltage diagram is no longer perpendicular to U V, as the inductance reactances $\omega L_1$, and $\omega L_2$ have altered with $\omega$, while the resistances $W_1$ and $W_2$ retain their value. Hence, when higher harmonics occur in the current flowing through the conductors, they will be measured by the indicating instrument.

As is generally known, the arc-extinguishing coil L is a self-induction coil connected between the ground and the neutral point of a winding in the system for the purpose of diverting the ground current from the ground point to prevent an arcing ground. For this reason, the coil must be tuned to at least approximate resonance with the partial capacity of the system.

Figure 6 is a vector diagram of the circuit shown in Fig. 3. In the diagram:
 $ab$ is a voltage vector on UM;
 $bc$ is a voltage vector on MV;
 $ad$ is a voltage vector on UN;
 $dc$ is a voltage vector on NV;
 $\omega_1, \omega_2$ are the circular frequencies;
 $i$ denotes current flowing through the bridge;
 $\alpha, \beta, \gamma$ denotes the angles of the triangles $abc$ and $adc$ respectively.

Therefore:

$$ab = dc = \frac{i}{2}\omega_1 L_1 = \frac{i}{2}\omega_1 L_2$$

$$bc = ad = \frac{i}{2}\omega_1 = \frac{i}{2}\omega_2$$

If $ab=cd=bc=ad$ for $\omega_1$, then tan $\alpha$ equals tan $\beta$ equals 1 and therefore $\alpha$ equals $\beta$ equals 45°. In this case, $bd$ is perpendicular on $ac$. If $\omega_1$ changes to $\omega_2$, the ratios $$\frac{bc}{ab} \text{ and } \frac{ad}{ac},$$

respectively, of the voltage vectors change, e. g., to $$\frac{b'c}{ab'} \text{ and } \frac{ad'}{d'c}.$$

Therefore, tan $\alpha$ is unequal to tan $\beta$ and $\alpha$ is unequal to $\beta$. In this case, the voltage vector $b' d'$ is not perpendicular on $ac$ which is the vector of the bridge voltage supplied to one winding of the indicating instrument. In Fig. 3 and $bd'$ is the voltage vector of the bridge voltage which is supplied to the other winding of the instrument. Because the instrument is arranged in such way that it shows a zero reading, if the voltages supplied to the two coils are equal and perpendicular as to their phases, this instrument will not respond to currents of the ground frequency if care is taken, (by suitable dimensioning resistance and self-induction of the bridge, that the vector diagonals $bd$ and $ac$ are perpendicular to each other at the ground frequency. Then the vector diagonals will have a phase angle other than 90° over the higher harmonics, a condition which takes place if the system is grounded. The instrument then indicates the presence of a ground.

Another arrangement for this purpose is shown in Fig. 4. The terminals of the secondary winding Q of the current transformer T are short-circuited over a circuit including series connected inductance and capacity tuned to resonance with the fundamental frequency. If a voltmeter V be connected to the same terminals, it will only indicate voltages of the frequency of the higher harmonic. In this way the fundamental may be eliminated from the indicating instrument.

The indicating arrangement described may also be used to detect in which part of a long feeder, fed on one side, ground is located. If several instruments be provided at points of the feeder far apart from one another, which instruments indicate the higher harmonics, only those instruments will indicate a higher harmonic current, which lie in the parts of the feeder disposed between the bus bars of the central station and the fault. The instruments lying beyond this part will not be deflected, as the current due to the ground does not flow therethrough. The instruments distributed in this manner may be used as relays for cutting out the feeder.

In such case it is preferable to let the instruments act with a time lag that is decreasing the further the instrument is from the bus bars of the central station. Such arrangement is shown in Fig. 5, wherein the parallel sets of feeders I and II are sectionalized by circuit breakers 21, 22, 23,—31, 32, 33,— which are arranged to be cut out by instruments 25, 26, in response to the flow of harmonic currents in the respective sections of the line, as explained above. The selective properties of the indicating device may be utilized equally well in complicated networks, it being only necessary to adapt the arrangement of the instruments to suit each case.

The advantage provided by a selective detection resides in the possibility of being able to find the position of the fault quickly and to remove the fault in the shortest possible time.

What I claim is:

1. In an alternating current distribution system, a plurality of lines normally insulated from the ground and having associated therewith an inductive grounding device for producing a flow of compensating currents on occurrence of a ground fault on one of said lines to substantially reduce the capacity current tending to flow to said ground fault, said grounding device having a core arranged to become saturated on occurrence of a ground fault, means responsive to currents flowing across said ground fault of harmonic frequencies for indicating said ground fault, the saturation of the core of said grounding device on the occurrence of a ground fault operating to increase substantially the magnitude of the harmonic frequency currents flowing across said ground fault which actuate said indicating means.

2. In an alternating current distributing system, in combination with a plurality of lines normally insulated from ground, and means responsive to the flow of currents of higher frequencies than the fundamental frequency of the system operative to indicate the presence of ground faults on any one of said lines upon the occurrence of such said faults, of means associated with said lines operative to produce the flow of compensating currents on occurrence of a ground fault on any one of said lines to substantially reduce the capacity current tending to flow across said ground faults, the last said means including means operative to substantially increase the magnitude of the higher frequency currents flowing across said faults which actuate the first said means.

3. In an alternating current distributing system, in combination with a plurality of lines normally insulated from ground, and means responsive to the flow of currents of higher frequencies than the fundamental frequency of the system operative to indicate the presence of ground faults on said lines upon the occurrence of such said faults, of inductive reactance means associated with said lines operative to produce the flow of compensating currents upon the occurrence of a ground fault on any one of said lines to substantially reduce the capacity currents tending to flow across said ground faults, the last said means comprising means operative upon the occurrence of a ground fault on any one of said lines to substantially increase the magnitude of the higher frequency currents flowing across said faults which cause actuation of the first said means.

In testimony whereof I have signed my name to this specification.

JULIUS JONAS.